(12) United States Patent
Tsuji et al.

(10) Patent No.: US 6,524,520 B1
(45) Date of Patent: Feb. 25, 2003

(54) HOLLOW MOLDED ARTICLE MANUFACTURING METHOD AND CONTAINER

(75) Inventors: Yoichiro Tsuji, Ichihara (JP); Kenji Iwamasa, Ichihara (JP)

(73) Assignee: Mitsui Chemicals, Inc., Tokyo (JP)

( * ) Notice: Subject to any disclaimer, the term of this patent is extended or adjusted under 35 U.S.C. 154(b) by 400 days.

(21) Appl. No.: 09/593,524

(22) Filed: Jun. 14, 2000

(30) Foreign Application Priority Data

Jun. 16, 1999 (JP) .......................... 11-169136

(51) Int. Cl.⁷ .............................. B29C 49/04
(52) U.S. Cl. .................................. 264/540
(58) Field of Search ........................ 264/540

(56) References Cited

U.S. PATENT DOCUMENTS 5,371,146 A * 12/1994 Takahashi et al. .......... 525/236

FOREIGN PATENT DOCUMENTS

| JP | 10025319 | 1/1998 |
| JP | 10194350 | 7/1998 |
| JP | 10195263 | 7/1998 |

* cited by examiner

*Primary Examiner*—Suzanne E. McDowell
(74) *Attorney, Agent, or Firm*—Birch, Stewart, Kolasch & Birch, LLP

(57) ABSTRACT

A method for manufacturing a hollow molded article by extruding a parison of an ethylene/α-olefin copolymer whose density, melt flow rate, melt tension, decane soluble matter content and melting point are controlled within particular ranges, while controlling the resin pressure in the extruder within a certain range, and then blow-molding such parison. This method makes it possible to improve the drawdown characteristic of the parison and to provide a container showing high mechanical strength and only a small amount of extraction into the contents of the article.

4 Claims, No Drawings

HOLLOW MOLDED ARTICLE MANUFACTURING METHOD AND CONTAINER

BACKGROUND OF THE INVENTION

1. Field of the Invention

The invention relates to a method for manufacturing a hollow molded article having a layer of ethylene/α-olefin copolymer and containers obtained by such method. More specifically, it relates to a method for manufacturing a hollow molded article having improved extrudability and mechanical strength and containers obtained by such method.

2. Description of the Background

Containers manufactured by the blow-molding method are used for various applications. For example, such containers comprising a single layer are used as food, kerosene and other containers; such containers comprising multiple layers with an ethylene/vinyl alcohol copolymer or polyamide resin are used as soft blow-molded containers such as mayonnaise and ketchup containers to keep the flavor of food; such containers in the form of blow-molded tubes are used as wasabi Japanese horseradish paste or mustard paste containers; and such containers in combination with corrugated board boxes, steel cans, etc. are used as back-in-boxes, drum-inner-bags, etc. Polyethylene is widely used for the raw material of these containers, and particularly a linear low density polyethylene (L-LDPE) is mainly used in the areas requiring heat resistance and mechanical strength.

However, the linear low density polyethylene tends to cause its parison to suffer a drawdown at the time of extrusion because of its low melt tension. On account of this, the linear low density polyethylene is not only difficult to mold but also hollow molded articles manufactured therefrom show a deviation in their wall thickness, thereby causing a decline in their mechanical strength. If a formulation in which a high-pressure low density polyethylene is blended to the linear low density polyethylene is adopted to improve such problem, the melt tension will increase, but the strength, for example, drop impact strength of a hollow molded article thereof may decline in some cases because the high-pressure low density polyethylene itself does not always have high mechanical strength.

Further, conventional linear low density polyethylene resins, having been manufactured by use of a titanium polymerization catalyst, have a broad molecular weight distribution and consequently contain a low molecular weight matter intrinsically. Because of this, there is a concern that such low molecular weight matter may be dissolved into the contents of hollow molded articles made of such conventional linear low density polyethylene resins. In this respect, new polyethylene resins manufactured by use of a metallocene polymerization catalyst have the characteristic of having a relatively narrow molecular weight distribution and composition or component distribution, and there is little concern that such polyethylene resins will cause the problem of any low molecular weight matter dissolving into the contents of hollow molded articles made thereof. However, it is said that with even such polyethylene resin yet having low melt tension, the manufacture of hollow molded articles is difficult similarly.

SUMMARY OF THE INVENTION

Accordingly it is an object of the invention to provide a method for manufacturing a hollow molded article showing an improved drawdown characteristic of a parison.

Another object of the invention is to provide a method for manufacturing a hollow molded article showing high mechanical strength and a small amount of extraction of its material into the contents of the hollow molded article.

Further object of the invention is to provide a container obtained by the method.

Other and further objects, features and advantages of the invention will appear more fully from the following description.

The present invention is related to a method for manufacturing a hollow molded article, in which at a time of blow-molding a parison having at least one ethylene/α-olefin copolymer layer by extruding it through an extruder die:

(1) the copolymer meets following physical properties (a) to (e):

(a) a density (d) is 0.880 to 0.970 (g/cm³);

(b) a melt flow rate (MFR) is 0.01 to 10 (g/10 minutes);

(c) a relationship between a melt tension (MT (g)) at 190° C. and the melt flow rate (MFR (g/10 minutes)) is:

$MT > 2.2 \times MFR^{-0.84}$;

(d) a relationship between a decane soluble matter content (W (wt %)) at 23° C. and the density (d) is:

$W < 80 \times \exp\{-100(d-0.88)\} + 0.1$;

and (e) a relationship between a temperature (Tm (° C.)) at a position of the highest peak of an endothermic curve as measured by use of a differential scanning calorimeter (DSC) and the density (d) is:

$Tm < 400 \times d - 248$, and (2) a resin pressure P (kg/cm²) at a time of extruding the parison has following relations with a resin temperature T (° C.), an extrusion rate K (kg/hour), an extruder die lip cross-section area A (cm²) and the melt flow rate MFR (g/10 minutes) of the resin.

$15033 \{K/(MFR)^{1.5}/(T-120)/A\}^{0.2} \leq P \leq 500 \times \{k/(MFR)^{1.5}/(T-120)/A\}^{0.2}$.

The present invention is also related to a container manufactured by the method, and it may be either single-layer container or multi-layer container.

DETAILED DESCRIPTION OF THE PREFERRED EMBODIMENTS

The hollow molded article manufacturing method of the invention relates to a method for manufacturing a hollow molded article having an ethylene/α-olefin copolymer layer. Next is given a specific explanation of each constituent of the manufacturing method and containers obtained by the method.

Ethylene/α-olefin Copolymer

The material of such hollow molded article is a random copolymer of an ethylene and an α-olefin. As such α-olefin, an α-olefin having 3 to 20 carbon atoms is preferable. Specific examples of the α-olefin include propylene, 1-butene, 1-pentene, 1-hexene, 4-methyl-1-pentene, 1-octene, 1-decene and 1-dodecene.

The ethylene content of the copolymer is normally 94 to 99 mol %, preferably 96 to 98 mol %, and the comonomer α-olefin content is normally 1 to 6 mol %, preferably 2 to 4 mol %. The ethylene and α-olefin contents can be measured by use of $^{13}$C-NMR.

Specifically, the composition of the copolymer can be determined normally by measuring $^{13}$C-NMR spectrum of a sample obtained by dissolving approximately 200 mg of the copolymer uniformly in 1 ml of hexachlorobutadiene in a test tube 10 mmφ under the conditions of the test temperature of 120° C., test frequency of 25.05 MHz, spectrum width of 1500 Hz, pulse repeating time of 4.2 seconds and pulse width of 6 μsec.

The density of the copolymer is in the range of 0.880 to 0.970, preferably 0.890 to 0.940 (g/cm³). If the density is in this range, it is desirable that a hollow molded article having excellent low-temperature impact resistance, rigidity and chemical resistance may be obtained. Here, the density is measured at 23±0.1° C. in accordance with Method D of JIS K-7112.

Moreover, the value of the MFR of the copolymer as measured at 190° C. and under a load of 2.16 kg in accordance with ASTM D-1238 is 0.01 to 10, preferably 0.05 to 9 (g/10 minutes). It is preferable that the MFR should be in this range because a hollow molded article having a satisfactory appearance may be obtained at high molding speed.

In addition, it is desirable that the copolymer should show the following relationship between melt tension (MT (g)) at 190° C. and melt flow rate (MFR (g/10 minutes)):

$$MT>2.2\times MFR^{-0.84},$$

preferably, $$MT>4.0\times MFR^{-0.84}.$$

If the melt tension is in this range, the drawdown characteristic of the parison is improved, and the mechanical strength of the hollow molded article is increased.

Here, the melt tension is determined by measuring the stress of a melted polymer when it is stretched at a constant rate. Specifically, resin pellets are fed to a melt tension tester, available from Toyo Seiki Seisakusho, and the melt tension is measured under the conditions of resin temperature: 190° C., extrusion rate: 15 mm/min., take-up speed: 10 to 20 m/min., nozzle diameter: 2.09 mmφ, and nozzle length: 8 mm.

On the other hand, it is desirable that the copolymer should show a relationship between the decane soluble matter content (W (wt %)) at 23° C. and the density (d) which meets the following conditions:

$$W<80\times\exp\{-100(d-0.88)\}+0.1,$$

preferably, $$W<60\times\exp\{-100(d-0.88)\}+0.1.$$

If the relationship between W and d is as shown above, that implies that the copolymer has a low content of low-molecular-weight matter. This may make it possible to reduce the amount of such low molecular weight matter bleeding out onto the wall surface of the hollow molded article, and to lessen the stickiness of the surface of the hollow molded article, which phenomenon was experienced with conventional linear low density polyethylene resins.

The decane soluble matter content (W) was measured by the method as described below. Approximately 3 g of the sample were added to 450 ml of n-decane and dissolved at 145° C. After that, the liquid was cooled to 23° C. and filtered for the removal of the n-decane insoluble matter. The n-decane soluble matter was recovered from the filtrate. The soluble and insoluble matter contents were measured by performing these operations, and the W value was calculated by the following formula:

$$W=\{(\text{n-decane soluble matter content})/(\text{n-decane soluble matter content}+\text{insoluble matter content})\}\times 100 \text{ (wt \%)}$$

In addition, the copolymer shows the following relationship between the temperature (Tm (° C.)) at the position of the highest peak of the endothermic curve as measured by use of a differential scanning calorimeter (DSC) and the density (d):

$$Tm<400\times d-248,$$

preferably, $$Tm<450\times d-297.$$

The relationship between Tm and d as shown above implies that the copolymer shows a narrow composition distribution of the ethylene and the α-olefin, and is desirable because the hollow molded article will have improved mechanical strength.

Here, in measuring the temperature at the highest peak position by use of DSC, Model DSC-7, available from Parkin Elmer, was used. Specifically, approximately 5 mg of the sample were packed into an aluminum pan and heated to 200° C. at a rate of 10° C./minute. When the temperature reached to 200° C., it was kept at that level for 5 minutes, lowered to room temperature at a rate of 10° C./minute and raised again at a rate of 10° C./minute, and the endothermic curve was obtained. The temperature corresponding to the highest peak was determined from the endothermic curve.

Further, the ethylene/α-olefin copolymer may be a copolymer having at least not less than one peak in the endothermic curve as determined by DSC in addition to the aforesaid highest peak. As shown in the Examples as described below, a copolymer having two or three peaks in the vicinity of 105° C., 113° C. and 123° C. as well as a copolymer having one peak may be used for the ethylene/α-olefin copolymer.

The ethylene/α-olefin copolymer meeting the aforesaid physical properties (a) through (e) is a material for a hollow molded article having excellent mechanical strength and showing satisfactory extrudability and blow-moldability, and it is suitable for use in the manufacture of hollow molded article.

Furthermore, it is desirable that the copolymer should contain a matter which is not extracted below 100° C. in a Temperature Rising Elution Fraction Test (TREF) and the amount of such matter is not more than 10 wt %, preferably not more than 8 wt %. If the insoluble matter content is within such range, the amount of the hollow molded article material bleeding out into the contents of the hollow molded article is little; and therefore such hollow molded article is preferable from a viewpoint of reducing the amount of the molded article material bleeding out into the contents of the molded article when the hot-filling of the contents is performed. The conventional linear low density polyethylene resins produced by use of a titanium polymerization catalyst contain a large amount of such insoluble matter as determined by the Temperature Rising Elution Fraction Test as shown in the Comparative Examples as described below, and therefore it is assumed that this has something to do with the extraction phenomenon caused by the bleeding-out of such insoluble matter into the contents of the molded article.

The Temperature Rising Elution Fraction Test (TREF) was conducted as follows.: The copolymer was dissolved in o-dichlorobenzene at a concentration of 200 mg/40 ml. 7.5 ml of the solution were injected into a column (2.14 cmφ×15 cm) filled with glass beads (100 μmφ) and cooled to 25° C. at a temperature falling rate of 10° C./hr. After that, while the temperature was being raised at a temperature raising rate of 15° C./hr, o-dichlorobenzene was supplied continuously at a constant rate of 1.0 ml/min. The matter being extracted was detected on line, and as a result, an extraction curve was drawn.

Moreover, it is desirable that in the molecules of the copolymer, there are more than three long-chain branches having not less than 6 carbon atoms per 1,000 carbon atoms as determined by NMR measurement. If the copolymer molecules have many long chains as described above, the melt tension will be raised, the drawdown characteristic of the parison will be improved, and the extrudability will be better. By contrast, conventional linear low density polyethylene resins have a small number of long chains, and this is presumed to be one of the reasons for them to tend to suffer a drawdown of the parison.

Furthermore, it is desirable that the copolymer should show a weight-average molecular weight (Mw)/a number-average molecular weight (Mn) ratio, i.e. Mw/Mn, being in the range of 2.8 to 15, preferably 3.0 to 10. If the Mw/Mn value being a broad or narrow index of molecular weight distribution is in this range, the copolymer shows a relatively narrow molecular weight distribution, and yet has a low content of low-molecular-weight polymer. Because of this, it may be possible to make the hollow molded article surface unsticky and reduce the amount of the material bleeding into the contents of the hollow molded article.

Further, the Mw/Mn value was obtained by measuring the Mw and Mn values of the copolymer by use of GPC and calculating the ratio between them. The GPC was conducted at 140° C. by using GPC Model ALC-GPC-150C available from Waters Co., using PSK-GMH-HT available from Tosoh Corporation as the column and the o-dichlorobenzene as the solvent.

Further, additives such as antioxidants, weathering stabilizers, light stabilizers, heat stabilizers, antistatic agents, lubricants, pigments, dyes, nucleators, plasticizers and hydrochloric acid absorbers may be compounded to the ethylene/α-olefin copolymer as required to such extent that the purpose of the invention is not frustrated. The ethylene/α-olefin copolymer, which is blended with such kind of additives as required, is preferably used for blow molding after it is mixed by use of a mixer such as a Henschel mixer, a tumbling mixer, a ribbon mixer, a Banbury mixer, a single-screw extruder, and a twin-screw extruder.

Method for Manufacturing the Ethylene/α-Olefin Copolymer

The copolymer having the physical properties can be manufactured satisfactorily by feeding an ethylene and an α-olefin having 3 to 20 carbon atoms to the polymerization system, using the olefin polymerization catalyst components (a) to (d) as described below.

(a) a transition metal compound in the Group IV of the periodic table which contains a ligand having the cyclopentadienyl skeleton;

(b) an organoaluminium oxy-compound;

(c) a support; and (d) an organoaluminium compound as required.

First given below an explanation of the olefin polymerization catalyst.

<(a) Transition Metal Compound>

This compound forming the center of the catalyst system is a transition metal compound in the Group IV of the periodic table containing a ligand having the cyclopentadienyl skeleton and is represented by the following general formula:

$$M L_{1(x)} \qquad (I)$$

(In the formula,

M represents a transition metal selected from the Group IV of the periodic table, specifically zirconium, titanium or hafnium, preferably zirconium;

$L_1$ represents the ligands attached to the transition metal atom, out of which at least two ligands $L_1$ are the cyclopentadienyl group or the substituted cyclopentadienyl group having not less than one substituent selected from among the hydrocarbon groups having 2 to 10 carbon atoms, with the other ligands being the hydrocarbon group having 1 to 12 carbon atoms, alkoxy group, aryloxy group, halogen atom, trialkylsilyl group or hydrogen atom, and each ligand and substituent may be the same or different from one another; and x represents the valence of the transition metal atom M.)

Examples of the transition metal compound represented by the above general formula include such compounds as:

Bis(cyclopentadienyl)zirconiumdichloride,
Bis(methylcyclopentadienyl)zirconiumdichloride,
Bis(ethylcyclopentadienyl)zirconiumdichloride,
Bis(n-propylcyclopentadienyl)zirconiumdichloride,
Bis(n-butylcyclopentadienyl)zirconiumdichloride,
Bis(n-hexylcyclopentadienyl)zirconiumdichloride,
Bis(n-hexylcyclopentadienyl)zirconiumdichloride,
Bis(methyl-n-propylcyclopentadienyl)zirconiumdichloride,
Bis(methyl-n-butylcyclopentadienyl)zirconiumdichloride,
Bis(dimethyl-n-butylcyclopentadienyl)zirconiumdichloride,
Bis(n-butylcyclopentadienyl)zirconiumdibromide,
Bis(n-butylcyclopentadienyl)zirconiummethoxychloride,
Bis(n-butylcyclopentadienyl)zirconiumethoxychloride,
Bis(n-butylcyclopentadienyl)zirconiumbutoxychloride,
Bis(n-butylcyclopentadienyl)zirconiumethochloride,
Bis(n-butylcyclopentadienyl)zirconiumethylide,
Bis(n-butylcyclopentadienyl)zirconiumbenzylchloride,
Bis(n-butylcyclopentadienyl)zirconiumdibenzyl,
Bis(n-butylcyclopentadienyl)zirconiumphenylchloride,
Bis(n-butylcyclopentadienyl)zirconiumhydridechloride, Bis(dimethylcyclopentadienyl)zirconiumdichloride,
Bis(diethylcyclopentadienyl)zirconiumdichloride,
Bis(methylethylcyclopentadienyl)zirconiumdichloride,
Bis(dimethylethylcyclopentadienyl)zirconiumdichloride,
Bis(dimethylcyclopentadienyl)zirconiumdibromide,
Bis(dimethylcyclopentadienyl)zirconiummethoxychloride,
Bis(dimethylcyclopentadienyl)zirconiumethoxychloride,
Bis(dimethylcyclopentadienyl)zirconiumbutoxychloride,
Bis(dimethylcyclopentadienyl)zirconiumdiethoxide,
Bis(dimethylcyclopentadienyl)zirconiummethylchloride,
Bis(dimethylcyclopentadienyl)zirconiumdimethyl,
Bis(dimethylcyclopentadienyl)zirconiumbenzylchloride,
Bis(dimethylcyclopentadienyl)zirconiumbenzyl,
Bis(dimethylcyclopentadienyl)zirconiumphenylchloride, and
Bis(dimethylcyclopentadienyl)zirconiumhydridechloride.

In the examples, the two substituents of the cyclopentadienyl ring contains 1,2-and 1,3-substituents, and the three substituents contain 1,2,3-and 1,2,4-substituents. Further, in the zirconium compounds, a transition metal compound replacing the zirconium metal with titanium metal or hafnium metal may be used.

Out of the transition metal compounds represented by the general formula, the following compounds are preferable:
Bis(n-propylcyclopentadienyl)zirconiumdichloride,
Bis(n-butylcyclopentadienyl)zirconiumdichloride,
Bis(1-methyl-3-n-propylcyclopentadienyl)zirconiumdichloride,
Bis(1-methyl-3-n-butylcyclopentadienyl)zirconiumdichloride,
Bis(1,3-dimethylcyclopentadienyl)zirconiumdichloride,
Bis(1,3-diethylcyclopentadienyl)zirconiumdichloride, and
Bis(1-methy-3-ethylcyclopentadienyl)zirconiumdichloride.

The transition metal compound used may be a mixture of two or more of the transition metal compounds represented by the aforesaid general formula. Specifically, examples of such mixture include the following combinations:

A combination of bis(1,3-n-butylmethylcyclopentadienyl)zirconiumdichloride and bis(1,3-dimethylcyclopentadienyl)zirconiumdichloride;

A combination of bis(1,3-n-propylmethylcyclopentadienyl)zirconium-dichloride and bis(1,3-dimethylcyclopentadienyl)zirconiumdichloride; and A combination of bis(n-butylcyclopentadienyl)zirconiumdichloride and bis(1,3-dimethylcyclopentadienyl)zirconiumdichloride.

Further the transition metal compound may be a mixture of a transition metal compound represented by the aforesaid general formula (I) and a transition metal compound represented by the following general formula (II):

(In the formula,
M represents a transition metal selected from the same Group IV of the periodic table as described above;

K and $L_2$ represent the ligands attached to the transition metal atoms, with the ligand K being the same or different indenyl group, substituting indenyl group, or a two-seat ligand with partially hydrogenated group thereof being bonded via the lower alkylene group, and the ligand $L_2$ being the hydrocarbon group having 1 to 12 carbon atoms, alkoxy group, aryloxy group, halogen atom, trialkylsilyl group or hydrogen atom; and x represents the valence of the transition metal atom M.)

Specific examples of the transition metal compound represented by the general formula (II) include the following compounds:
Ethylenebis(indenyl)zirconiumdichloride;
Ethylenebis(4-methyl-1-indenyl)zirconiumdichloride; and
Ethylenebis(4,5,6,7-tetrahydro-1-indenyl)zirconium-dichloride.

It is desirable that a combination of at least one transition metal compound selected from among the transition metal compounds represented by the general formula (I) and at least one transition metal compound selected from among the transition metal compounds represented by the general formula (II) should be used for the transition metal compound. In the case of using such combination, the (I)/(II) mol ratio is in the range of preferably 99/1 to 50/50, more preferably 97/3 to 70/30, much more preferably 95/5 to 75/25.

<(b) Organoaluminium Oxy-compound>

The organoaluminium oxy-compound may be the benzene-soluble organoaluminium oxy-compound already known to the public or the benzene-insoluble organoaluminium oxy-compound disclosed in Japanese Laid-Open Patent Publication No. 276807/1990. The organoaluminium oxy-compound may be used singly or in combination of not less than two types.

Such organoaluminium oxy-compound may be prepared by the following method, for example:

(1) Method in which an organoaluminium compound such as trialkylaluminium is added to a hydrocarbon medium suspension of magnesium chloride hydrate, copper sulfate hydrate, aluminium sulfate hydrate, nickel sulfate hydrate, cerium chloride hydrate, etc. to allow them to react with each other so that an organoaluminium oxy-compound may be recovered as hydrocarbon solution;

(2) Method in which water, ice or steam is added directly to organoaluminium compound such as trialkylaluminium in a solvent such as benzene, toluene, ethyl ether and tetrahydrofuran to allow them to react with each other, so that an organoaluminium oxy-compound may be recovered as hydrocarbon solution; and (3) Method in which an organic tin oxide such as dimethyltinoxide or dibutyltinoxide is added to an organoaluminium compound such as trialkylaluminium in a solvent such as decane, benzene and toluene.

Specific examples of the organoaluminium compound used in preparing the aluminiumoxy compound include the following compounds:

(1) Trialkylaluminiums such as trimethylaluminium, triethylaluminium, tripropylaluminium, triisopropylaluminium, tri-n-butylaluminium, triisobutylaluminium, tri-sec-butylaluminium, tri-tert-butylaluminium, tripentylaluminium, trihexylaluminium, trioctylaluminium and tridecylaluminium;

(2) Tricycloalkylaluminiums such as tricyclohexylaluminium and tricyclooctylaluminium;

(3) Dialkylaluminiumhalides such as dimethylaluminiumchloride, diethylaluminiumchloride, diethylaluminiumbromide and diisobutylaluminiumchloride;

(4) Dialkylaluminiumhalides such as diethylaluminiumhalide and diisobutylaluminiumhalide;

(5) Dialkylaluminiumalkoxides such as dimethylaluminiummethoxide and diethylaluminiumethoxide; and (6) Dialkylaluminiumaryloxides such as diethylaluminiumphenoxide.

Out of these, especially the use of trialkylaluminium is preferablely used.

Furthermore, as this organoaluminium compound, isoprenylaluminium represented by the following general formula may be used:

$$(i\text{-}C_4H_9)_x Al_y (C_5H_{10})_z$$

(In the above formula, x, y and z are positive numbers, and $z \leq 2x$.)

Examples of the solvent used in preparing the aluminium oxy-compound include aromatic hydrocarbons such as benzene, toluene, xylene, cumene and cymene, aliphatic hydrocarbons such as pentane, hexane, heptane, octane, decane, dodecane, hexadecane and octadecane, alicyclic hydrocarbons such as cyclopentane, cyclohexane, cyclooctane and methylcyclopentane, petroleum fractions such as gasoline, kerosine and gas oil, and halides, especially chlorides and bromides, of the aforesaid aromatic hydrocarbons, aliphatic hydrocarbons and alicyclic hydrocarbons, particularly hydrocarbon solvents. In addition, ethers such as ethylether and tetrahydrofuran may be used. Out of these solvents, especially aromatic hydrocarbons are preferable.

Here, the benzene-insoluble organoaluminium oxy-compounds contain not more than 10%, preferably not more than 5% of the Al component soluble in benzene at 60° C. as converted into Al atoms, and are insoluble, or do not dissolve readily, in benzene.

<(c) Support>

The support to be used is an inorganic or organic compound, which is a solid in the state of granules or fine particles having the particle diameter of 10 to 300 μm, preferably 20 to 200 μm. Such inorganic support is preferably a porous oxide, and specific examples of the inorganic support include $SiO_2$, $Al_2O_3$, MgO, $ZrO_2$, $TiO_2$, $Sb_2O$, CaO, ZnO, BaO and $ThO_2$, or mixtures of these, such as $SiO_2$—MgO, $SiO_2$—$Al_2O_3$, $SiO_2$—$TiO_2$, $SiO_2$—$V_2O_5$, $SiO_2$—$Cr_2O_3$ and $SiO_2$—$TiO_2$—MgO. Out of these, oxides comprising $SiO_2$ or $Al_2O_3$ as the principal component are preferable.

Such support differs in properties, depending on the kind and the manufacturing process thereof. However, the support preferably to be used has preferably a specific surface of 50 to 1,000 m²/g, preferably 100 to 700 m²/g, and a pore volume of 0.3 to 2.5 cm³/g. The support may be sintered as required at 100 to 1,000° C., preferably 150 to 700° C. before use.

As an example of other supports that can be used, a granular or fine-particle solid of an organic compound having a particle diameter of 10 to 300 μm may be cited. Examples of such organic compound include polymers or copolymers comprising α-olefins having 2 to 14 carbon atoms, such as ethylene, propylene, 1-butene and 4-methyl-1-pentene as the principal component, or polymers or copolymers comprising vinylcyclohexane and styrene as the principal component.

<(d) Organoaluminium Compound>

For the organoaluminium compound that is to be added as required, the compound represented by the following general formula (III) may be cited as an example:

$$R_{1(n)}Al\ X_{(3-n)} \tag{III}$$

(In the above formula, $R_1$ represents the hydrocarbon group having 1 to 12 carbon atoms, X represents halogen atom or hydrogen atom, and n is 1 to 3.)

Examples of $R_1$ include the alkyl group, cycloalkyl group or aryl group, specifically methyl group, ethyl group, n-propyl group, isopropyl group, isobutyl group, pentyl group, hexyl group, octyl group, cyclopentyl group, cyclohexyl group, phenyl group and tolyl group.

As specific examples of such organoaluminium compound, the following compounds may be cited:

(1) Trialkylaluminiums such as trimethylaluminium, triethylaluminium, triisopropylaluminium, triisobutylaluminium, trioctylaluminium and tri-2-ethylhexylaluminium;

(2) Alkenylaluminiums such as isoprenylaluminium;

(3) Dialkylaluminiumhalides such as dimethylaluminiumchloride, diethylaluminiumchloride, diisopropylaluminiumchloride, diisobutylaluminiumchloride and dimethylaluminiumbromide;

(4) Alkylaluminiumsesquihalides such as methylaluminiumsesquichloride, ethylaluminiumsesquichloride, isopropylaluminiumsesquichloride, butylaluminiumsesquichloride and ethylaluminiumsesquibromide;

(5) Alkylaluminiumdihalides such as methylaluminiumdichloride, ethylaluminiumdichloride, isopropylaluminiumdichloride and ethylaluminiumdibromide; and (6) Alkylaluminiumhidrides such as diethylaluminiumhidride and diisobutylaluminiumhidride.

Furthermore, as this organoaluminium compound, the compound represented by the following general formula (IV) may be used:

$$R_{1(n)}Al\ Y_{(3-n)} \tag{IV}$$

(In the above formula, $R_1$ represents the same hydrocarbon group as $R_1$ of the aforesaid general formula (III);

Y represents the —$OR_2$ group, —$OSi(R_3)_3$, $OAl(R_4)_2$ group, —$N(R_5)_2$ group, —$Si(R_6)_3$ group or —$N(R_7)Al(R_8)_2$ group; n is 1 to 2; $R_2$, $R_3$, $R_4$ and $R_8$ represent the methyl group, ethyl group, isopropyl group, isobutyl group, cyclohexyl group, phenyl group, etc.; $R_5$ represents hydrogen atom, methyl group, ethyl group, isopropyl group, phenyl group, trimethylsilyl group, etc.; and $R_6$ and $R_7$ represent the methyl group, ethyl group, etc.)

As such organoaluminium compound, the following compounds are specifically used:

(1) Compounds represented by $R_{1(n)}Al(OR_2)_{(3-n)}$, such as dimethylaluminium-methoxide, diethylaluminiumethoxide and diisobutylaluminiummethoxide;

(2) Compounds represented by $R_{1(n)}Al(OSi(R_3)_3)_{(3-n)}$, such as $Et_2Al(OSiMe_3)$, $(iso-Bu)_2Al(OSiMe_3)$ and $(iso-Bu)_2Al(OSiEt_3)$;

(3) Compounds represented by $R_{1(n)}Al(OAl(R_4)_2)_{(3-n)}$, such as $Et_2AlOAl\ Et_2$ and $(iso-Bu)_2AlOAl\ (iso-Bu)_2$;

(4) Compounds represented by $R_{1(n)}Al(N(R_5)_2)_{(3-n)}$, such as $Me_2AlNEt_2$, $Et_2Al\ NHMe$, $Me_2AlNHEt$, $Et_2AlN(SiMe_3)_2$ and $(iso-Bu)_2AlN(SiMe_3)_2$;

(5) Compounds represented by $R_{1(n)}Al(Si(R_6)_3)$ such as $(iso-Bu)_2AlSiMe_3$; and (6) Compounds represented by $R_{1(n)}Al(N(R_7)Al(R_8)_2)_{(3-n)}$, such as $Et_2Al\ N(Me)AlEt_2$ and $(iso-Bu)_2AlN(Et)Al(iso-Bu)_2$.

Out of the organoaluminium compounds represented by the aforesaid general formulas (III) and (IV), the compounds represented by the general formulas $(R_1)_3Al$, $R_{1(n)}Al(OR_2)_{(3-n)}$, and $R_{1(n)}Al(OAl(R_4)_2)_{(3-n)}$. Especially those compounds having the general formula in which $R_1$ is the isoalkyl group and n is 2 are preferable.

<Catalyst Preparation Method>

The olefin polymerization catalyst is prepared by bringing component (a), component (b), support (c) and as required component (d) into contact. The sequence of bringing them into contact is selected optionally. However, preferably support (c) and component (b) are mixed and brought into contact, then component (a) is mixed and brought into contact with them, and as required component (d) is mixed and brought into contact.

These components may be brought into contact in an inactive hydrocarbon solvent. Specific examples of such inactive hydrocarbon medium that is to be used in the preparation of the catalyst include aliphatic hydrocarbons such as propane, butane, pentane, hexane, heptane, octane, decane, dodecane and kerosine; alicyclic hydrocarbons such as cyclopentane, cyclohexane and methylcyclopentane; aromatic hydrocarbons such as benzene, toluene and xylene; halogenated hydrocarbons such as ethylenechloride, chlorobenzene and dichloromethane; and mixtures thereof.

In mixing and bringing into contact component (a), component (b), support (c) and as required component (d), component (a) is used in an amount of normally $5 \times 10^{-6}$ to $5 \times 10^{-4}$ mol, preferably $10^{-5}$ to $2 \times 10^{-4}$ mol, and the concentration of component (a) is in a range of approximately $10^{-4}$ to $2 \times 10^{-2}$ mol/liter, preferably $2 \times 10^{-4}$ to $10^{-2}$ mol/liter. The atomic ratio (Al/transition metal) between aluminium of component (b) and transition metal of component (a) is normally 10 to 500, preferably 20 to 200. The atomic ratio (Al-d/Al-b) between aluminium atoms (Al-d) of component (d), which is used as required, and aluminium atoms (Al-b) of component (b) is in a range of normally 0.02 to 3, preferably 0.05 to 1.5. The mixing temperature at the time of mixing and bringing into contact component (a), component (b), support (c) and as required component (d) is normally −50 to 150° C., preferably −20 to 120° C., and the contacting time is normally 1 minute to 50 hours, preferably 10 minutes to 25 hours.

The olefin polymerization catalyst thus obtained is supported in such manner that the transition metal atoms deriving from component (a) are supported in an amount of $5 \times 10^{-6}$ to $5 \times 10^{-4}$, preferably $10^{-5}$ to $2 \times 10^{-4}$ gram atom per g of support (c). It is desirable that the aluminium atoms deriving from component (b) and component (d) should be supported in an amount of $10^{-3}$ to $5 \times 10^{-2}$, preferably $2 \times 10^{-3}$ to $2 \times 10^{-2}$ gram atom per g of support (c).

The olefin polymerization catalyst may be a prepolymerized catalyst obtained by prepolymerizing olefin in the presence of component (a), component (b), support (c) and as required component (d). The prepolymerization may be carried out by introducing the olefin into an inactive hydrocarbon solvent in the presence of component (a), component (b), support (c) and as required component (d).

Examples of the olefin that is to be used in the prepolymerization include α-olefins having 2 to 20 carbon atoms, such as ethylene, propylene, 1-butene, 1-pentene, 4-methyl-1-pentene, 1-hexene, 1-octene, 1-decene, 1-dodecene and 1-tetradecene. Out of these, ethylene, or a combination of ethylene and α-olefin that is to be used in the polymerization, is preferable.

At the time of the prepolymerization, component (a) is used in a concentration of normally $10^{-6}$ to $2 \times 10^{-2}$ mol/liter, preferably $5 \times 10^{-5}$ to $10^{-2}$ mol/liter, and the amount of component (a) is used in normally $5 \times 10^{-6}$ to $5 \times 10^{-4}$ mol, preferably $10^{-5}$ to $2 \times 10^{-4}$ mol per g of support (c). The atomic ratio (Al/transition metal) between aluminium of component (b) and transition metal of component (a) is normally 10 to 500, preferably 20 to 200. The atomic ratio (Al-d/Al-b) between aluminium atoms (Al-d) of component (d), which is used as required, and aluminium atoms (Al-b) of component (b) is in a range of normally 0.02 to 3, preferably 0.05 to 1.5. The prepolymerization temperature is −20 to 80° C., preferably 0 to 60° C., and the prepolymerization time is 0.5 to 100 hours, preferably 1 to 50 hours.

The prepolymerized catalyst is prepared by the method as described below, for example. Specifically, support (c) is brought into a suspended state in an inactive hydrocarbon. Next, an organoaluminium oxy-compound (component (b)) is added to this suspension and allowed to react for a particular time. After that, the supernatant liquid is removed, and the solid matter thus obtained is brought into a suspended state again in an inactive hydrocarbon. A transition metal compound (component (a)) is added to this system and allowed to react for a particular time. After that, the supernatant liquid is removed, and the solid catalyst component is obtained. Subsequently, the solid catalyst component obtained as described above is added to the inactive hydrocarbon containing the organoaluminium compound (component (d)), and the olefin is introduced into the liquid so that the prepolymerized catalyst is obtained.

It is desirable that the amount of the olefin copolymer formed by the prepolymerization is 0.1 to 500, preferably 0.2 to 300, more preferably 0.5 to 200 g per g of support (c). Further, in the prepolymerized catalyst, component (a) is supported in an amount of approximately $5 \times 10^{-6}$ to $5 \times 10^{-4}$, preferably $10^{-5}$ to $2 \times 10^{-4}$ gram atom terms of transition metal atoms per g of support (c). It is desirable that the aluminium atoms (Al) deriving from component (b) and component (d) should be supported in a molar ratio (Al/M)

to the transition metal atoms (M) deriving from component (a) which ranges from 5 to 200, preferably 10 to 150.

The prepolymerization may be carried out by either batch or continuous process and under either vacuum, normal pressure or raised pressure. It is desirable that in the prepolymerization, a prepolymer is so produced in the presence of hydrogen that at least the intrinsic viscosity [η] as measured in decaline at 135° C. is in a range of 0.2 to 7, preferably 0.5 to 5 (dl/g).

<Polymerization Method>

The ethylene/α-olefin copolymer (a) used in the invention can be obtained by copolymerizing an ethylene and an α-olefin having 3 to 20 carbon atoms in the presence of the olefin polymerization catalyst or prepolymerized catalyst.

The copolymerization of the ethylene and the α-olefin is conducted in the gas phase or in the slurry-like liquid phase. In slurry polymerization, an inactive hydrocarbon may be used as the solvent, or the olefin itself may be used as the solvent.

Specific examples of the inactive hydrocarbon solvent to be used in such slurry polymerization include aliphatic hydrocarbons such as butane, isobutane, pentane, hexane, octane, decane, dodecane, hexadecane and octadecane; alicyclic hydrocarbons such as cyclopentane, methylcyclopentane, cyclohexane and cyclooctane; aromatic hydrocarbons such as benzene, toluene and xylene; and petroleum fractions such as gasoline, kerosine and gas oil. Out of these inactive hydrocarbon media, the aliphatic hydrocarbons, alicyclic hydrocarbons and petroleum fractions are especially preferable.

In conducting the copolymerization by the slurry polymerization process or the gas phase polymerization process, it is desirable that the aforesaid olefin polymerization catalyst or prepolymerized catalyst should be used in an amount of normally $10^{-8}$ to $10^{-3}$, preferably $10^{-7}$ to $10^{-4}$ (gram atom/liter) in terms of the concentration of the transition metal atoms in the polymerization reaction system.

Furthermore, in the polymerization, an organoaluminium oxy-compound like component (b) and/or the organoaluminium compound (d) may be added. In this cased, the atomic ratio (Al/M) between the aluminium atoms (Al) deriving from the organaluminium oxy-compound and the organoaluminium compound and the transition metal atoms (M) deriving from the transition metal compound (a) is a range of 5 to 300, preferably 10 to 200, more preferably 15 to 150.

In using the slurry polymerization process, the polymerization temperature is in a range of −50 to 100° C., preferably 0 to 90° C.; and in using the gas phase polymerization process, the polymerization temperature is in a range of normally 0 to 120° C., preferably 20 to 100° C.

The polymerization pressure is either normal pressure to a raised level of 100 kg/cm², preferably 2 to 50 kg/cm². The polymerization may be accomplished by either batch, semi-continuous or continuous process. The polymerization may also be carried out in two or more stages.

Furthermore, the polymerization may be conducted by carrying out copolymerization in two or more stages in which reaction conditions are different by using one or not less than two reactors.

Hollow Molded Article Manufacturing Method

In the hollow molded article manufacturing method, an ethylene/α-olefin copolymer having the physical properties as described before is fed to a blow-molding machine, sent to the die at the end of an extruder while being melted in the extruder, extruded as a parison from the ring-like die, and blow-molded it in divided blow molds.

At the time of the extrusion of the parison, it is desirable that the molding operations should be performed with the resin pressure controlled as described below as the conditions for extruding the melted material. Specifically, the resin pressure P should be controlled in a range as represented by the following formula that shows a relationship among a resin temperature T (° C.), an extrusion rate K (kg/hour), a die-lip cross-section area A (cm²) of the molding machine, and the resin melt flow rate MFR (g/10 minutes):

$$150 \times \{K/(MFR)^{1.5}/(T-120)/A\}^{0.2} \leq P \leq 500 \times \{K/(MFR)^{1.5}/(T-120)/A\}^{0.2}.$$

These molding conditions are desirable extrusion conditions that improve the drawdown characteristic of the parison having the ethylene/α-olefin copolymer layer and enable a hollow molded article having satisfactory appearance to be manufactured at high molding speed.

Hollow Molded Container

The container of the invention is a hollow molded article having at least one layer of the ethylene/α-olefin copolymer and being obtained in accordance with the manufacturing method as described before, it may be a single-layer container comprising only the layer of the ethylene/α-olefin copolymer, or a multi-layer container comprising a layer of the ethylene/α-olefin copolymer and a layer of other resin.

The manufacture of the single-layer container is conducted by the common blow-holding method. In manufacturing the multi-layer container, two or more extruders are made available, and a coextrusion die is attached to the end of the section coupling them, and then the manufacture of the container is carried out by the common blow-molding method. Specifically, the ethylene/α-olefin copolymer is extruded from one of the extruders under the desirable extrusion conditions as described before, while another resin is extruded under certain conditions from another extruder, and the extrudates are passed through the coextrusion die to form a multi-layer parison. The parison is sandwiched with a pair of the divided molds and blow-molded so that a multi-layer container is manufactured.

In manufacturing a multi-layer container, a layer of gas barrier resin such as polyamide resin, polyester resin, polycarbonate resin and ethylene/vinyl alcohol copolymer resin may be arranged as another resin layer extruded together with the layer of the ethylene/α-olefin copolymer in a proper manner. Since these gas barrier resin layers do not normally have good adhesion with the ethylene/α-olefin copolymer layer, an adhesive resin layer using unsaturated carboxylic acid graft modified polyolefin or the like is provided between the two layers.

Depending on the kind of the contents of the container or the physical properties required of the container itself, a three layer structure comprising the ethylene/α-olefin copolymer layer/adhesive resin layer/gas barrier resin layer may be used, or a more than three layer structure having four or five layers, which include another resin layer provided between the aforesaid layers or outside the gas barrier resin layer, may be used.

Such single-layer or multi-layer containers may be used as packaging containers such as general purpose containers, kerosene cans, industrial chemicals cans, gasoline tanks, mayonnaise containers, ketchup containers, edible oil bottle, bag-in-boxes and drum-inner-bags and as blow-molded tubes for storing wasabi Japanese horseradish paste, mustard paste, etc.

EXAMPLES

The invention will be understood more readily with reference to the following examples; however these examples are intended to illustrate the invention and are not to be constructed to limit the scope of the invention.

Reference Example

First, the ethylene/α-olefin copolymer used was manufactured by the following method:
<Preparation of Polymerization Catalyst>
10 kg of silica previously dried at 250° C. for 10 hours were brought into a suspended state using 154 liters of toluene and then cooled to 0° C. After that, 57.5 liters of toluene solution of methylaluminooxane (Al=1.33 mol/liter) were dropped to the suspension in one hour. At that time, the temperature of the suspension was kept at 0° C. After that, the liquid was allowed to continue to react at 0° C. for 30 minutes, heated to 95° C. over 1.5 hours, and allowed to react at that temperature for 20 hours. After that, the liquid was cooled to 60° C., and the supernatant liquid was removed by the decantation method.

The solid matter thus obtained was washed twice with toluene and then brought into a suspended state again with 100 liters of toluene. 16.8 liters of toluene solution of bis(1,3-dimethylcyclopentadienyl)zirconiumdichloride (Zr= 27.0 milmol/liter) were dropped to the suspension at 80° C. over 30 minutes and then allowed to react at 80° C. for 2 hours. After that, the supernatant liquid was removed and washed twice with hexane. As a result, a solid catalyst containing 3.5 mg of zirconium per g was obtained.
<Preparation of Pre-polymerized Catalyst>
870 g of the solid catalyst obtained as described above and 260 g of 1-hexene were added to 87 liters of hexane containing 2.5 mol of triisobutylaluminium, and pre-polymerization of ethylene was carried out at 35° C. for 5 hours. As a result, a pre-polymerized catalyst on which 10 g of polyethylene per g of solid catalyst have been pre-polymerized was obtained.
<Polymerization>
Using continuous fluidized-bed gas-phase polymerization apparatus, ethylene and 1-hexene was copolymerized at a total pressure of 20 kg/cm$^2$-G and a polymerization temperature of 80° C. The pre-polymerized catalyst previously prepared was continuously fed at a rate of 0.33 milmol/h in terms of zirconium atom, and triisobutylaluminium was fed at a rate of 10 milmol/h. In order to maintain a constant gas phase composition during polymerization, ethylene, 1-hexene, hydrogen and nitrogen were continuously fed (gas phase composition: 1-hexene/ethylene=0.02; hydrogen/ethylene=10.5×10$^{-4}$; ethylene concentration=70%).

The ethylene/1-hexene copolymer thus obtained was used in Example 1, and its physical properties were shown in Table 1. The copolymers used in Examples 2 to 8 were manufactured similarly as described above by varying the polymerization conditions, and its physical properties are also shown in Table 1.

Examples 1 to 8

Each of the eight types of ethylene/1-hexene copolymer shown in Table 1 was fed to a 65-mmφ single-screw extruder. Next, a single-layer parison was extruded under the extrusion conditions shown in Table 1 and blow-molded. As a result, a bottle having a 780-cc capacity was manufactured.

The drawdown characteristic of the parison in the molding process and the drop impact strength of the bottle thus obtained were measured, and results are shown together in Table 1.

Further, the measurement results were determined by the following method:
(1) Drawdown characteristic of the parison:
   Time (sec.) was measured in which the length of the parison reached 17 cm at screw rotary speed of 30 rpm.
(2) Bottle drop impact strength:
   A cylindrical bottle (780-cc captivity) was dropped at −18° C., and the height (m) at which the bottle did not fail in 5 tests was determined.

Comparative Examples 1 to 3

Three kinds of linear low density polyethylene (ethylene/4-methyl-1-pentene copolymer; L-LDPE) manufactured by use of a conventional titanium polymerization catalyst were used, and their physical properties are shown in Table 2. A bottle was molded by carrying out the same operations as described in Example 1 except that the kind of the L-LDPE was different, and the drawdown characteristic of the parison in the molding process and the drop impact strength of the bottle thus obtained were measured, and results are shown together in Table 2.

Comparative Example 4

A bottle was molded by carrying out the same operations as described in Example 1 except that 20 parts of high-pressure low density polyethylene were blended to 80 parts of the L-LDPE used in Comparative Example 2, and the drawdown characteristic of the parison in the molding process and the drop impact strength of the bottle thus obtained were measured, and results are shown together in Table 2.

It appears from the experimental results shown in Table 1 and Table 2 that the copolymers used in Ex. 1–8 have the good extrudability under the law resin pressure preventing from the drawdown characteristics of the parison and the obtained hollow molded articles have the high drop impact strength or the low decane soluble matter content, comparing to the copolymers used in Comp. Ex. 1–3 as the conventional linear low density polyethylene, or the composition used in Comp. Ex.4. comprising of the conventional linear low density polyethylene and the high-pressure low density polyethylene. Accordingly the experimental results show that the manufacturing method of the present invention gives the good balance between extrudability of the resin and physical properties of the obtained hollow articles.

EFFECT OF THE INVENTION

According to the hollow molded article manufacturing method of the invention, an ethylene/α-olefin copolymer having a narrow molecular weight distribution and composition or component distribution and high melt tension is used as the material of a hollow molded article, and the parison is extruded under particular extrusion condition, and therefore the drawdown characteristic of the parison is improved, making it possible to manufacture a hollow molded article having excellent mechanical strength at high molding speed. Furthermore, since the ethylene/α-olefin copolymer has a low content of the low-molecular-weight matter, the amount of the material of a hollow molded article bleeding out into the contents thereof may be reduced. This enables such molded article to be used for the packaging container of a variety of materials, including food.

It is further understood by those skilled person in the art that the foregoing description is a preferred embodiment of the disclosed method for manufacturing hollow molded article and container, and that various changes and modifications may be made in the invention without departing from the spirit and scope thereof.

TABLE 1

|  | Ex. 1 | Ex. 2 | Ex. 3 | Ex. 4 | Ex. 5 | Ex. 6 | Ex. 7 | Ex. 8 |
|---|---|---|---|---|---|---|---|---|
| Physical properties of copolymer: | | | | | | | | |
| Density (g/cm$^3$) | 0.905 | 0.905 | 0.920 | 0.920 | 0.920 | 0.920 | 0.935 | 0.935 |
| MFR (g/10 min) | 0.5 | 3 | 0.5 | 0.5 | 1.5 | 3 | 0.5 | 3 |
| Melt tension (g) | 12 | 6 | 6 | 10 | 3 | 5 | 10 | 5 |
| Calculation value of Formula (1) | 3.9 | 0.9 | 3.9 | 3.9 | 1.6 | 0.9 | 3.9 | 0.9 |
| Decane soluble component content (wt %) | 5 | 8 | 1 | 1 | 1 | 1 | 1 | 1 |
| Calculation value of Formula (2) | 14.6 | 14.6 | 9.4 | 9.4 | 9.4 | 9.4 | 8.3 | 8.3 |
| Endothermic peak as measured by DSC (° C.) | [113] | [105], 113 | 105, [115], 120 | 105, [115], 125 | [112], 118 | [115], 120 | 110, [124] | [123] |
| Calculation value of Formula (3) | 114 | 114 | 120 | 120 | 120 | 120 | 126 | 126 |
| TREF insoluble component content (wt %) | 9 | 8 | 10 | 6 | 5 | 7 | 3 | 4 |
| No. of long-chain branches (pcs/1,000 carbon atoms) | 3.6 | 4.8 | 3.1 | 5 | 3.2 | 4 | 3.2 | 3.1 |
| Extrusion conditions: | | | | | | | | |
| Resin temperature (° C.) | 200 | 200 | 200 | 200 | 200 | 200 | 200 | 200 |
| Extrusion rate (kg/h) | 50 | 50 | 50 | 50 | 50 | 50 | 50 | 50 |
| Lip cross-sectional area (cm$^2$) | 0.75 | 0.75 | 0.75 | 0.75 | 0.75 | 0.75 | 0.75 | 0.75 |
| Resin pressure (kg/cm$^2$) | 300 | 270 | 300 | 250 | 300 | 250 | 300 | 250 |
| Calculation value of Formula (4) | 178 | 104 | 178 | 178 | 128 | 104 | 178 | 104 |
| Calculation value of Formula (5) | 595 | 347 | 595 | 595 | 428 | 347 | 595 | 347 |
| Results of molding: | | | | | | | | |
| Drawdown characteristic of parison (sec) | 14 | 10 | 14 | 14 | 14 | 12 | 10 | 10 |
| Bottle drop impact strength (m) | 2.5 | 1.8 | 2.0 | 2.0 | 1.8 | 1.2 | 1.5 | 1.2 |

*Formula (1) $2.2 \times MFR^{-0.84}$

*Formula (2) $80 \times \exp\{-100(d - 0.88)\} + 0.1$

*Formula (3) $400 \times d - 248$

*Formula (4) $150 \times \{K/(MFR)^{1.5}/(T-120)/A\}^{0.2}$

*Formula (5) $500 \times \{K/(MFR)^{1.5}/(T-120)/A\}^{0.2}$

*The measured value being enclosed with a square in the column of "Endothermic peak as measured by DSC" is shown a temperature at a position of the highest peak.

TABLE 2

|  | Comp. Ex. 1 | Comp. Ex. 2 | Comp. Ex. 3 | Comp. Ex. 4 |
|---|---|---|---|---|
| Physical properties of copolymer: | | | | |
| Density (g/cm³) | 0.905 | 0.920 | 0.935 | 0.920 |
| MFR (g/10 min) | 2 | 2 | 2 | 1.5 |
| Melt tension (g) | 0.7 | 0.8 | 0.8 | 6 |
| Calculation value of Formula (1) | 1.2 | 1.2 | 1.2 | 1.6 |
| Decane soluble component content (wt %) | 15 | 11 | 9 | 11 |
| Calculation value of Formula (2) | 14.6 | 9.4 | 8.3 | 9.4 |
| Endothermic peak as measured by DSC (° C.) | [118], 125 | [124] | [128] | 108, [125] |
| Calculation value of Formula (3) | 114 | 120 | 126 | 120 |
| TREF insoluble component content (wt %) | 35 | 13 | 11 | 11 |
| No. of long-chain branches (pcs/1,000 carbon atoms) | 2.8 | 2 | 2 | 2.6 |
| Extrusion conditions: | | | | |
| Resin temperature (° C.) | 200 | 200 | 200 | 200 |
| Extrusion rate (kg/h) | 50 | 50 | 50 | 50 |
| Lip cross-sectional area (cm²) | 0.75 | 0.75 | 0.75 | 0.75 |
| Resin pressure (kg/cm²) | 450 | 450 | 450 | 440 |
| Calculation value of Formula (4) | 118 | 118 | 118 | 128 |
| Calculation value of Formula (5) | 392 | 392 | 392 | 428 |
| Results of molding: | | | | |
| Drawdown characteristic of parison (sec) | 7 | 6.5 | 7 | 11 |
| Bottle drop impact strength (m) | 1.6 | 1.2 | 1.0 | 0.7 |

*Formula (1) $2.2 \times MFR^{-0.84}$
*Formula (2) $80 \times \exp\{-100(d - 0.88)\} + 0.1$
*Formula (3) $400 \times d - 248$
*Formula (4) $150 \times \{K/(MFR)^{1.5}/(T-120)/A\}^{0.2}$
*Formula (5) $500 \times \{K/(MFR)^{1.5}/(T-120)/A\}^{0.2}$
*The measured value being enclosed with a square in the column of "Endothermic peak as measured by DSC" is shown a temperature at a position of the highest peak.

What we claim is:

1. A method for manufacturing a hollow molded article, in which at a time of blow-molding a parison having at least one ethylene/α-olefin copolymer layer by extruding it through an extruder die:

(1) the copolymer meets following physical properties (a) to (e):
 (a) a density (d) is 0.880 to 0.970 (g/cm³);
 (b) a melt flow rate (MFR) is 0.01 to 10 (g/10 minutes);
 (c) a relationship between a melt tension (MT (g)) at 190° C. and the melt flow rate (MFR (g/10 minutes)) is:

$MT > 2.2 \times MFR^{-0.84}$;

(d) a relationship between a decane soluble matter content (W (wt %)) at 23° C. and the density (d) is:

$W < 80 \times \exp\{-100(d-0.88)\} + 0.1$;

and
 (e) a relationship between a temperature (Tm (° C.)) at a position of the highest peak of an endothermic curve as measured by use of a differential scanning calorimeter (DSC) and the density (d) is:

$Tm < 400 \times d - 248$, and
(2) a resin pressure P (kg/cm²) at a time of extruding the parison has following relations with a resin temperature T (° C.), an extrusion rate K (kg/hour), an extruder die lip cross-section area A (cm²) and the melt flow rate MFR (g/10 minutes) of the resin:

$150 \times \{K/(MFR)^{1.5}(T-120)/A\}^{0.2} \leq P \leq 500 \times \{K/(MFR)^{1.5}/(T-120)/A\}^{0.2}$.

2. A method for manufacturing a hollow molded article according to claim 1, in which the ethylene/α-olefin copolymer has at least not less than one peak in addition to the highest peak of the endothermic curve as measured by use of DSC.

3. A method for manufacturing a hollow molded article according to claim 1, in which the ethylene/α-olefin copolymer contains a matter that is not extracted by a Temperature Rising Elution Fractionation Test (TREF) below 100° C. and a content of the matter is not more than 10 wt %.

4. A method for manufacturing a hollow molded article according to claim 1, in which the ethylene/α-olefin copolymer has molecules having more than three long-chain branches, which have not less than 6 carbon atoms, per 1,000 carbon atoms as determined by NMR measurement.

\* \* \* \* \*